(No Model.)

S. F. GILMORE.
DENTAL DISK HOLDER.

No. 470,670. Patented Mar. 15, 1892.

Witnesses
F. L. Ourand
W. L. Coombs

Inventor
Steele F. Gilmore,
By his Attorneys
Saws Bagger & Co

UNITED STATES PATENT OFFICE.

STEELE F. GILMORE, OF PRINCETON, INDIANA, ASSIGNOR TO THE S. S. WHITE DENTAL MANUFACTURING COMPANY, OF PHILADELPHIA, PENNSYLVANIA.

DENTAL DISK-HOLDER.

SPECIFICATION forming part of Letters Patent No. 470,670, dated March 15, 1892.

Application filed July 1, 1891. Serial No. 398,106. (No model.)

*To all whom it may concern:*

Be it known that I, STEELE F. GILMORE, of Princeton, in the county of Gibson and State of Indiana, have invented certain new and useful Improvements in Mandrels, of which the following is a specification.

My invention relates to certain improvements, as hereinafter specifically claimed, in mandrels or rotary carriers especially applicable to use in connection with dental-engine hand-pieces for holding disks of sand-paper, celluloid, felt, &c., for abrading, polishing, and cutting; and my object mainly is to provide a simply-constructed, easily-manipulated, and durable disk-holding mandrel the disk-securing clamp of which is so applied as not to require its separation from the mandrel in attaching and removing the disks.

In the accompanying drawings, which show a suitable embodiment of my invention—

Figure 1:
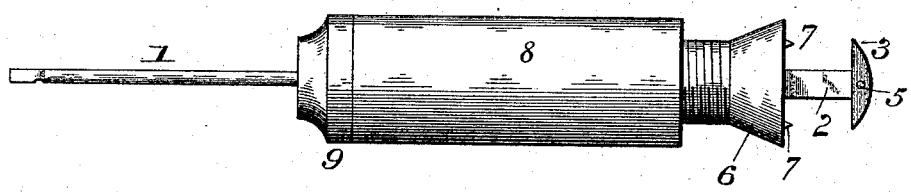
Figure 2:
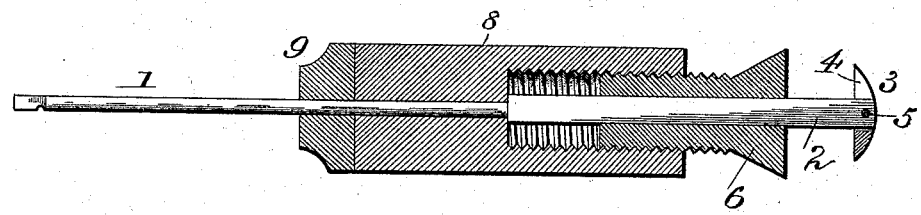
Figure 3:
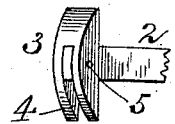

Figure 1 is a side elevation showing the device as ready for attachment to a hand-piece; Fig. 2, a longitudinal central section thereof, and Fig. 3 a view in perspective of the mandrel end and its pivoted cross-head.

The device is adapted for connection with a hand-piece in well-known manner by way of the cylindrical inner portion or shank end 1 of the driving-spindle or mandrel proper, which at its outer end is flattened, as at 2, and engaged with a cross-head 3, which is centrally jointed to the spindle by a pivot-pin 5. The cross-head is provided with a slot 4 to embrace the spindle end and is adapted to be rocked on its pivot, so as to extend parallel with the spindle and project for a portion of its length in advance thereof or extend crosswise of the spindle in the position represented by the drawings. A movable clamp-piece 6 has an aperture longitudinally and centrally through it, which is made angular in cross-section to correspond in shape with the flattened portion of the spindle, which passes through it. The clamp 6, it will be seen, is capable of sliding or reciprocating upon the spindle, but is prevented from turning thereon. At its outer end or face the clamp is provided with spurs or pointed projections 7 for engagement with the disk to be held, and the clamp is screw-threaded to engage with a corresponding screw-thread in a sleeve 8. This sleeve serves to work or reciprocate the clamp 6 when rotated about the spindle and clamp. To adapt the sleeve to its work, it is bored centrally to fit and rotate about the spindle between its flattened portion and a fixed collar 9 thereon.

The operation of clamping a disk upon the mandrel is as follows: With the parts in the position as shown in the drawings, the cross-head is turned on its pivot into a position such as to extend parallel with the mandrel, with its pointed solid end projecting beyond the mandrel. The head is then passed centrally through the disk, after which the head is turned into its normal position, or crosswise of the mandrel. The sleeve is next rotated, advancing the clamp and firmly securing the disk, the spurs of the clamp aiding in holding the disk. By reversing the operation of securing the disk it can be detached. It will be seen that the disks can readily be attached and detached, that when properly clamped they are securely held against displacement regardless of the direction of rotation of the mandrel, and that, as no portion of the device has to be removed or disconnected from the mandrel, displacement or loss of parts is impossible.

I claim as my invention—

The combination of the mandrel, the cross-head, the screw-threaded clamp reciprocating on the mandrel, and the sleeve rotating about the mandrel and provided with the screw-thread for actuating the clamp, substantially as set forth.

In testimony that I claim the foregoing as my own I have hereunto affixed my signature in presence of two witnesses.

STEELE F. GILMORE.

Witnesses:
CASH. C. LESTER,
LEVIN W. GUDGEL.